United States Patent [19]

Saha et al.

[11] Patent Number: 4,855,205
[45] Date of Patent: Aug. 8, 1989

[54] INTERDISPERSED TWO-PHASE FERRITE COMPOSITE AND CARRIER THEREFROM

[75] Inventors: Bijay S. Saha, Rochester; Robert E. Zeman, Webster, both of N.Y.

[73] Assignee: Eastman Kodak Company, Rochester, N.Y.

[21] Appl. No.: 229,366

[22] Filed: Aug. 5, 1988

[51] Int. Cl.$^4$ .................. G03G 9/10; G03G 9/14
[52] U.S. Cl. ................ 430/106.6; 430/108; 252/62.57
[58] Field of Search ............ 430/106.6, 108; 252/62.57

[56] References Cited

U.S. PATENT DOCUMENTS

| | | |
|---|---|---|
| 2,900,344 | 8/1959 | Stuyts et al. . |
| 3,996,392 | 12/1976 | Berg et al. ............ 430/108 X |
| 4,172,722 | 10/1979 | Hirakura et al. ............ 423/594 |
| 4,540,645 | 9/1985 | Honda et al. ............ 430/122 |
| 4,623,603 | 11/1986 | Iimura et al. ............ 430/108 |

FOREIGN PATENT DOCUMENTS

| | | | |
|---|---|---|---|
| 0109860 | 10/1987 | European Pat. Off. . | |
| 0265133 | 4/1988 | European Pat. Off. . | |
| 55-130862 | 10/1980 | Japan ............ | 252/62.57 |
| 58-215663 | 12/1983 | Japan ............ | 430/106.6 |
| 59-127054 | 7/1984 | Japan ............ | 430/106.6 |
| 59-197047 | 11/1984 | Japan ............ | 430/106.6 |
| 60-7441 | 1/1985 | Japan ............ | 430/106.6 |
| 61-296363 | 12/1986 | Japan ............ | 430/108 |
| 62-124564 | 6/1987 | Japan . | |

OTHER PUBLICATIONS

Japanese Patent Abstract No. J56100165-A (J85054907-B).
Netherlands Patent Abstract NL7401198-A (DE24046-36-A).

Primary Examiner—Roland E. Martin
Attorney, Agent, or Firm—Willard G. Montgomery

[57] ABSTRACT

Disclosed is an interdispersed two-phase ferrite composite which comprises about 0.1 mole to about 1.0 mole of a spinel phase having the general formula MFe$_2$O$_4$ where M is at least one element that forms a spinel ferrite, to about 2.5 moles of a magnetoplumbite phase having the general formula R$_x$P$_{1-x}$Fe$_{12}$O$_{19}$ where R is selected from rare earth elements, P is selected from the group consisting of strontium, barium, calcium, lead, and mixtures thereof, and x has a value of from about 0.1 to about 0.4. Also disclosed is a carrier formed from magnetized and polymerically coated particles of the composite, a developer formed from a carrier and a toner, and a magnetic brush formed from a multiplicity of juxtaposed magnetically aligned hairs formed of the carrier.

12 Claims, 2 Drawing Sheets

INTERDISPERSED TWO-PHASE FERRITE COMPOSITE AND CARRIER THEREFROM

TECHNICAL FIELD

The invention relates to hard ferrite magnetic carriers for use in electrostatographic copy machines. More particularly, it relates to an interdispersed two-phase ferrite composite where a first ferrite phase has a spinel structure and a second ferrite phase has a magnetoplumbite structure, for use in such carriers.

BACKGROUND ART

In an electrostatographic process a latent electrostatic image is formed on a photoconductor. That image can be developed by means of a rotating magnetic brush that consists of small magnetic carrier particles which, under the influence of magnets in the core of the brush, form fur-like hairs extending from the core. The magnetic brush triboelectrically charges toner particles and carries those charged toner particles to the oppositely charged electrostatic latent image on the photoconductor, thereby developing the image. The developed image is then transferred to a receiver such as paper.

In copending U.S. patent application Ser. No. 62,023, filed June 15, 1987 by E. T. Miskinis et al., titled "Electrographic Magnetic Carrier Particles," now U.S. Pat. No. 4,764,445, there is described hard ferrite magnetic carrier particles, for use in two component developers, which contain from about 1 to about 5% by weight of lanthanum. The presence of lanthanum in the ferrite increases the conductivity of the ferrite and improves its development efficiency.

Japanese Patent Laid-Open No. 124564/1987 (Application No. 263684/1985) titled "Carrier for Developing Electrostatic Charge Images," describes two-phase ferrite carrier particles where one phase forms the core of the particle and a second phase forms the shell of the particle. The core has a hexagonal structure and a mixture of hexagonal and spinel structures and consists of 5 to 30% BaO, 5 to 30% ZnO, and 5 to 90% $Fe_2O_3$. The shell has a spinel structure and is formed from a ferrite slurry consisting (in mole percentage) of 5 to 20% NiO, 5 to 35% ZnO, and 40 to 70% $Fe_2O_3$, or a ferrite slurry in which a part of the aforementioned components is substituted by one or two or more sorts of metal of univalency or greater.

DISCLOSURE OF INVENTION

We have discovered that the properties of the hard ferrite magnetic carrier particles described in the aforementioned U.S. patent application Ser. No. 62,023 can be improved by the addition of zinc or similar element which forms a two-phase composite structure. We have found that the magnetic moment of the resulting composite structure is lower, which results in a softer magnetic brush having more hairs per unit area. This, in turn, results in lower granularity in a copy made using that brush and therefore in better copy quality. We have further found that, unlike the carrier particles described in the aforementioned Japanese Patent Laid-Open No. 124564/1987, the two-phase composite carrier particles of this invention have a much higher coercivity, which results in better flow of the carrier particles, better charging of the toner, and the delivery of more toner to the photoconductor.

0.1 mole spinel or "S" phase: $ZnFeO_4$ 2.5 mole magnetoplumbite or "M" phase: $La_xSr_{(1-x)}Fe_{12}O_{19}$ where "x" is 0.21, prepared according to Example 1. (Particles prepared according to Examples 2, 3, and 4 have the same surface morphology.)

Figure 1:
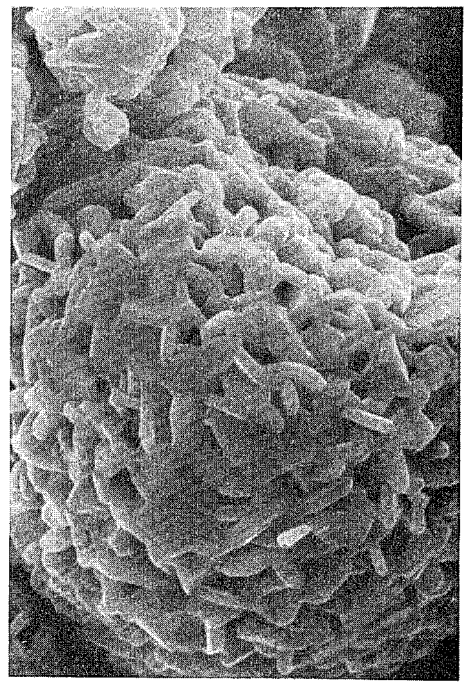
FIG. 1 is a scanning electron micrograph made at 25 kilovolts and 5,000 times magnification showing a hard magnetic ferrite particle having the composition $Sr_{0.79}La_{0.21}Fe_{12}O_{19}$, prepared according to Example 1 of hereinbefore cited U.S. patent application Ser. No. 62,023.
Figure 3:
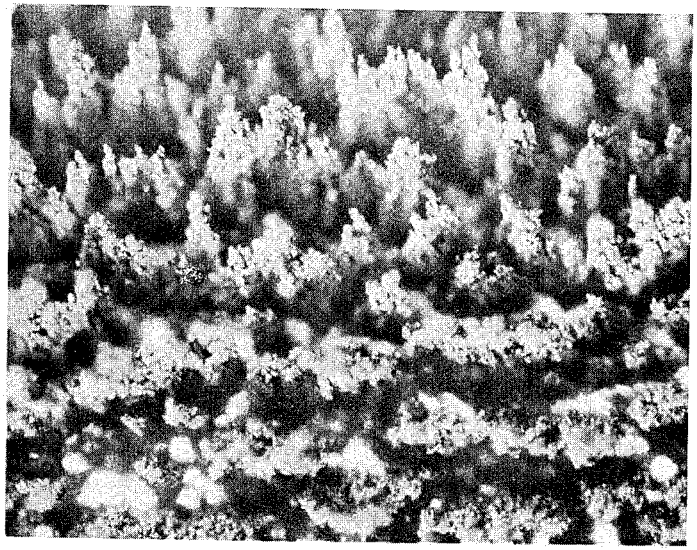

FIG. 3 is an optical enlargement at 25 times magnification showing the surface of a magnetic brush made with the carrier particles shown in FIG. 1.

Figure 2:
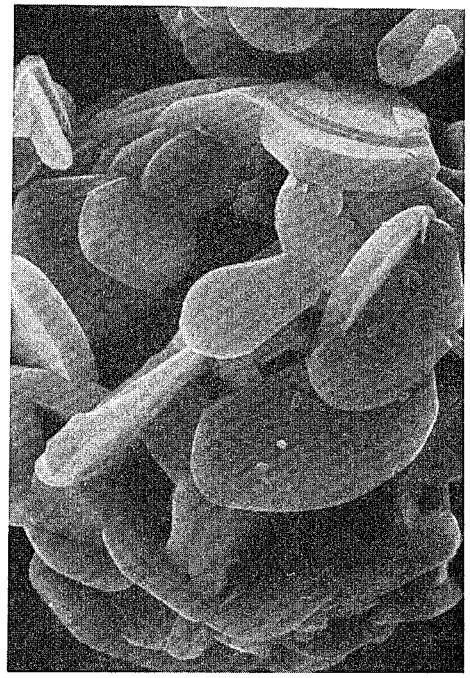
FIG. 2 is a scanning electron micrograph made at 25 kilovolts and 5,000 times magnification showing a homogeneous two-phase composite structure hard magnetic ferrite partcle according to this invention having the composition.
Figure 4:
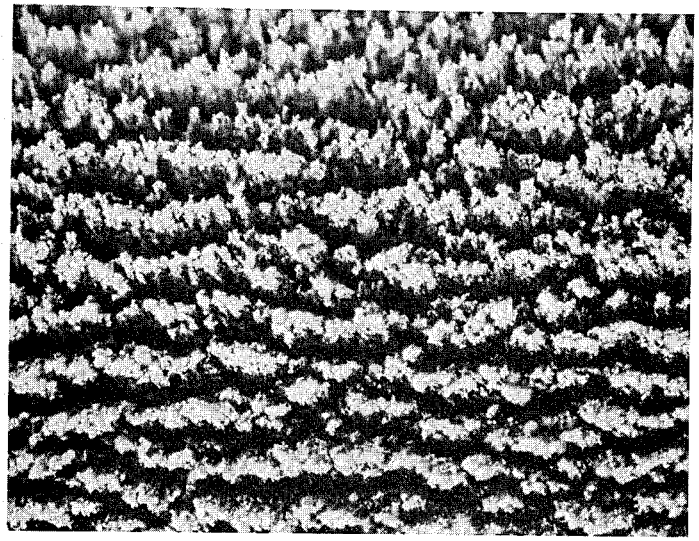

FIG. 4 is an optical enlargement at 25 times magnification showing the surface of a magnetic brush made with the carrier particles shown in FIG. 2.

A comparison of FIGS. 3 and 4 shows that the hairs of the brush of FIG. 4 are closer together and that the voids in between hairs is smaller. Since the hair pattern is to some extent transferred to the copy, the hair pattern of FIG. 4 will be less visible on the copy than the pattern of FIG. 3, and the quality of the copies will be higher.

BEST MODE FOR CARRYING OUT THE INVENTION

The carrier particles of this invention comprise a homogeneous mixture of two separate phases. The first phase is a spinel or "S" phase which has a cubic crystal structure and can be represented by the general formula $MFe_2O_4$ where M is at least one element that forms a spinel ferrite. Examples of such elements include the divalent elements nickel, cobalt, copper, zinc, manganese, magnesium, iron, and mixtures thereof. (When iron is used, the ferrite has the formula $Fe_3O_4$.) The preferred M element is zinc because it reduces the magnetic moment the most. Least preferred are iron, cobalt, and nickel because they reduce the magnetic moment the least; however, they still beneficially improve the surface morphology as shown in FIG. 2. A mixture of monovalent and polyvalent elements can also be used as the M element, provided that the molar quantities of the elements are inversely proportional to their valences, that a spinel ferrite is formed, and that no cross-reaction occurs between the spinel phase and the "M" phase. For example, one could use a mixture of 0.6 moles of chromium and 0.2 moles of sodium. In a similar way other polyvalent elements such as aluminum can also be utilized to partially replace iron.

The second phase is a magnetoplumbite phase or "M" phase which has a hexagonal crystal structure. The "M" phase has the general formula $R_xP_{(1-x)}Fe_{12}O_{19}$. In that formula, R is rare earth element selected from lanthanum, praseodymium, neodymium, samarium, europium, and mixtures thereof; lanthanum is preferred. Also in the general formula, P can be strontium, barium, calcium, lead, or mixture thereof. Of these four elements, calcium is the least preferred and strontium is the most preferred because it is less toxic and more commercially accepted. Also in the formula, "x" can be about 0.1 to about 0.4 or, to put it another way, the R element can substitute for about 1 to about 5% by weight of the P element. In the composite, about 0.1 moles to about 1 mole of the spinel phase are present for every 2.5 moles of the M phase. If more spinel phase is present developer pickup may occur, which means that the carrier may be transferred on to the photoconductor, and if too little of the spinel phase is present the benefits of the invention, a smoother brush and higher image quality, will not be obtained.

The composites of this invention can be prepared by conventional procedures that are well known in the art of making ferrites. Suitable procedures are described, for example, in U.S. Pats. Nos. 3,716,630, 4,623,603, and 4,042,518; European Patent Application No. 0 086 445; "Spray Drying" by K. Masters, published by Leonard Hill Books London, pages 502–509 and "Ferromagnetic Materials," Volume 3 edited E. P. Wohlfarth, and published by North Holland Publishing Company, Amsterdam, N.Y., page 315 et seq. Briefly, a typical preparation procedure might consist of mixing oxides of the elements in the apropriate proportion with an organic binder and water and spray-dring the mixture to form a fine dry particulate. The particulate can then be fired, which produces the ferrite composite. The composite is magnetized and is typically coated with a polymer, as is well known in the art, to better enable the carrier particles to triboelectrically charge the toner particles. Since the presence of rare earth in the ferrite is intended to improve the conductivity of carrier particles, the layer of resin on the carrier particles should be thin enough that the mass of particles remains conductive. Preferably the resin layer is discontinuous so that spots of bare ferrite on each particle provide conductive contact. The carrier particles can be passed through a sieve to obtain the desired range of sizes. A typical particle size, including the polymer coating, is about 5 to about 60 micrometers, but smaller sized carrier particles, about 5 to about 20 micrometers, are preferred as they produce a better quality image. Additional details describing the preparation and use of ferrite magnetic carrier particles can be found in copending application Ser. No. 62,023, hereinbefore cited, and herein incorporated by reference.

The composite ferrite carrier particles of this invention exhibit a coercivity of at least 300 Oresteds when magnetically saturated, and an induced magnetic moment of at least 15 EMU/gm of carrier in an applied field of 1000 Oersteds. Preferred particles were unexpectedly discovered to have a magnetic moment of about 30 to about 55 compared to identical particles which did not contain the spinel phase. Preferred particles also were found to have a high coercivity, typically about 1000 to about 3000 gauss. A high coercivity is desirable as it results in better carrier flow, which means that the carrier particles flip 180° on the brush rather than sliding along the core of the brush, which results in a higher charge on the toner and more delivery of the toner to the photoconductor.

The two phases in the composite are interdispersed or homogeneously mixed and it has not been possible to determine whether one phase or the other forms a continuous phase. FIG. 2 shows that each carrier particle is formed of a number of small agglomerated crystal-lites. Comparing FIGS. 1 and 2 it is clear that the presence of the spinel phase results in smaller sized crystallites and fewer large voids, which present more surface contact with the toner particles. The particles are also generally spherical, as shown in FIG. 2, which is desirable as it increases the mechanical stablity of the particles on the magnetic brush.

The present invention comprises two types of carrier particles. The first of these carriers comprises the ferrite composite, free of a binder, and exhibiting the requisite coercivity and induced magnetic moment. This type is preferred.

The second is heterogeneous and comprises a composite of a binder and a ferrite composite, exhibiting the requisite coercivity and included magnetic moment. The ferrite composite is dispersed as discrete smaller particles throughout the binder; however, the resistivity of these binder type polymers must be comparable to the binderless carrier particles in order for the above stated advantages to be observed. It may therefore be desirable to add conductive carbon black to the binder to insure electrical contact between the ferrite particles.

A developer can be formed by mixing the carrier particles with toner particles in a suitable concentration. Within developers of the invention, high concentrations of toner can be employed. Accordingly, the present developer preferably contains from about 70 to 99 weight percent carrier and about 1 to 30 weight percent toner based on the total weight of the developer; most preferably, such concentration is from about 75 to 99 weight percent carrier and from about 1 to 25 weight percent toner.

The toner component of the invention can be a powdered resin which is optionally colored. It normally is prepared by compounding a resin with a colorant, i.e, a dye or pigment, and any other desired addenda. The amount of colorant can vary over a wide range, e.g., from 3 to 20 weight percent of the polymer. Combinations of colorants may be used. The toner can also contain minor components such as charge control agents and antiblocking agents.

The mixture is heated and milled to disperse the colorant and other addenda in the resin. The mass is cooled, crushed into lumps, and finely ground. The resulting toner particles range in diameter from 0.5 to 25 micrometers with an average size of 1 to 16 micrometers. Preferably, the average particle size ratio of carrier to toner lies within the range from about 15:1 to about 1:1. However, carrier-to-toner average particle size ratios of as high as 50:1 are also useful.

The invention is further illustrated by the following examples.

EXAMPLE 1

Powders of strontium carbonate, lanthanum oxide, iron oxide, and either zinc, cupric, nickel, or magnesium oxide were weighed and mixed thoroughly. In a separate container, a stock solution was prepared by dissolving 4 weight percent (based on stock solution weight) of a binder resin and 0.4 weight percent ammonium polymethacrylate surfactant (sold by W. R. Grace and Co. as "Daxad-32") in distilled water. The powders were mixed with the stock solution in a 50:50 weight ratio, and the mixture was ball milled for about 24 hours then spray dried. The green bead particles thus formed were classified to obtain a suitable particle size distribution. The green bead was then fired at a temperature between 900° and 1250° C. for 10 to 15 hours. The fired cake, thus obtained, was deagglomerated and the powder was sieved to be used as carrier. The resulting carriers had a two-phase composite structure with a spinel phase consisting of $ZnFe_2O_4$, $CuFe_2O_4$, $NiFe_2O_4$ or $MgFe_2O_4$ and an "M" phase consisting of $Sr_{0.79}La_{0.21}Fe_{12}O_{19}$. The mole ratio of the "M" phase was kept constant at 2.5 with the "S" phase being 0.0, 0.5 or 1.0 moles. (A higher ratio of the "S" phase can be obtained utilizing the same procedure along with a variable mole ratio, other than 2.5, of the "M" phase.)

The samples were subjected to a vibrating sample magnetometer test. The following table gives the results:

| Spinel Phase | Moles per 2.5 moles "M" phase | Magnetization (EMU/g) | Coercivity (Oersteds) |
|---|---|---|---|
|  | 0.0 | 56.55 | −2273 |
| $ZnFe_2O_4$ | 0.5 | 40.73 | −2312 |
|  | 1.0 | 31.64 | −2038 |
| $CuFe_2O_4$ | 0.5 | 47.72 | −2370 |
|  | 1.0 | 42.66 | −1840 |
| $NiFe_2O_4$ | 0.5 | 55.33 | −1336 |
|  | 1.0 | 53.45 | −840.5 |
| $MgFe_2O_4$ | 0.5 | 47.9 | −2260 |
|  | 1.0 | 41.94 | −1541 |

The above table shows that the magnetization (i.e., the magnetic moment) was reduced significantly as the concentration of spinel phase increased, and that the zinc spinel phase had the largest reduction in magnetization.

X-ray diffraction studies were also performed on these examples. The x-ray diffraction patterns showed that both a spinel and a "M" phase were present and that no cross reaction had occurred between the two phases and among the various chemical species.

EXAMPLE 2

The "bare core" samples prepared in Example 1 were tested for charging properties using a copolymerized styrene-butylacrylate toner having a volume average particle size of 2.9 micrometers, a ratio of volume average to number average particle size of 3.2/3.9, and a charge level of 0.2%. The following table gives the results.

| Spinel Phase | Moles per 2.5 moles "M" phase | ½ sec. Q/m | Toner Conc. (g/g of sample) | ½ min. Q/m | Toner Conc. (g/g of sample) | Throw off |
|---|---|---|---|---|---|---|
| $ZnFe_2O_4$ | 0.5 | 6.8 | 1.1 | 20.6 | 11.7 | 0.0040 |
|  | 1.0 | 5.9 | 1.1 | 17.2 | 12.3 | 0.0048 |
| $CuFe_2O_4$ | 0.5 | 8.6 | 0.66 | 17.3 | 11.0 | 0.0288 |
|  | 1.0 | 6.2 | 0.65 | 13.0 | 12.5 | 0.0327 |
| $NiFe_2O_4$ | 0.5 | 10.4 | 1.1 | 34.3 | 10.4 | 0.0075 |
|  | 1.0 | 7.5 | 0.79 | 21.9 | 11.0 | 0.0021 |
| $MgFe_2O_4$ | 0.5 | 4.0 | 0.51 | 7.2 | 10.1 | 0.112 |
|  | 1.0 | 3.9 | 1.5 | 9.2 | 11.7 | 0.0088 |

In the above table, the charge on the toner, Q/M, in microcoulombs/gram, was measured using a standard procedure in which the toner and carrier are placed on a horizontal electrode beneath a second horizontal electrode and are subjected to both an AC magnetic field and a DC electric field. When the toner jumps to the other electrode the change in the electric charge is measured and is divided by the weight of toner that jumped. The table gives the charge on the toner 0.5 seconds after initiation of the AC magnetic field. Also in the above table, the throw off is a measurement of the strength of the electrostatic bond between the toner and the carrier. A magnetic brush loaded with toner is rotated and the amount of toner that is thrown off the carrier is measured. A device employing a developer station as described in U.S. Pat. No. 4,473,029 and a Buchner funnel disposed over the magnetic brush such that the filter paper is in the same relative position as the photoreceptor was used to determine throw-off of developer during rotation of the brush. The brush is rotated for each carrier for two minutes while vacuum is drawn and developer is collected on the filter paper. The table shows that the charging properties and throw off of the bare core samples were acceptable.

Carriers were made by mixing 50 grams of sample with 0.5 grams of a coating resin, sieving to 140 mesh, rolling 15 minutes on a roll mill, curing in an oven for 4 hours at 230° C., and sieving to 230 mesh. The carriers were mixed with toner and tested for charging properties, as hereinabove described. The following table gives the results.

| Spinel Phase | Moles per 2.5 moles "M" phase | ½ sec. Q/m | Toner Conc. (g/g of sample) | ½ min. Q/m | Toner Conc. (g/g of sample) | Throw off |
|---|---|---|---|---|---|---|
| $ZnFe_2O_4$ | 0.5 | 33.3 | 0.17 | 165.9 | 2.9 | 0.005 |
|  | 1.0 | 50.0 | 0.16 | 151.7 | 3.2 | 0.001 |
| $CuFe_2O_4$ | 0.5 | 22.9 | 0.35 | 140.0 | 2.7 | 0.0007 |
|  | 1.0 | 26.7 | 0.30 | 135.0 | 3.1 | 0.0010 |
| $NiFe_2O_4$ | 0.5 | 36.0 | 0.24 | 152.3 | 2.9 | 0.0010 |
|  | 1.0 | 152.3 | 2.9 | 148.1 | 3.2 | 0.0028 |
| $MgFe_2O_4$ | 0.5 | 26.5 | 0.25 | 171.3 | 2.8 | 0.0048 |
|  | 1.0 | 40.0 | 0.19 | 138.3 | 3.6 | 0.0064 |

The above table shows that the charging properties and throw off of the carriers were acceptable.

EXAMPLE 3

Samples prepared as in example 1 which had 0.5, 0.75, and 1.0 moles of a $ZnFe_2O_4$ spinel phase per 2.5 moles of the "M" phase were heated with 1% resin, as in Example 2, and were tested in a xerographic copy machine at a toner concentration of 6 weight percent using the toner described in Example 2. The grain of the copies was analyzed and the analysis showed that the eye-weighted apparent graininess was reduced compared to the graininess of a copy made using an identical ferrite carrier which did not contain the spinel phase, in the same ratio with the same toner at the same charge level. The graininess of the sample containing 1.0 moles of the spinel phase was reduced the most, 20%, which corresponds to approximately 3 grain units. (One grain unit is a visually detectable difference.)

EXAMPLE 4

Using ASTM test B527-85, the tap densities of samples prepared as in Example 1 were measured. The following table gives the results:

| Moles $ZnFe_2O_4$ phase per 2.5 moles "M" phase | Tap Density (g/cc) |
|---|---|
| 0.0 | 1.85 |
| 0.25 | 1.86 |
| 0.5 | 2.14 |
| 0.75 | 2.24 |

| Moles ZnFe$_2$O$_4$ phase per 2.5 moles "M" phase | Tap Density (g/cc) |
|---|---|
| 1.0 | 2.31 |

The above table shows that the tap density (measured by tapping the powder in a cylinder) increases with the concentration of the spinel phase, which is attributed to the morphology of the particles. Thus, the concentration of the spinel phase can be used to control the surface morphology. A higher tap density is desirable if the magnetic brush is small and one desires more carrier on the brush.

EXAMPLE 5

Examples 1 to 4 can be repeated using neodymium, praseodymium, samarium, europium, or a mixture thereof, or a mixture thereof with lanthanum, instead of lanthanum, with comparable results.

INDUSTRIAL APPLICABILITY

The composite particles of this invention are useful as carriers and in making toners and developers for use in any electrostatographic process, including electrophotographic processes where the electrostatic charge on the photoconductor is induced by light, and dielectric recording processes, where the electrostatic charge on the photocondctor is induced electronically. The particles can be used as part of a single component toner, and as part of a two-component developer, where they reduce dusting and provide a magnetically readable image. They can also be used as cleaning particles in a magnetic brush cleaning station. They are also useful in making soft and hard sintered magnets because the saturation magnetic moment and the coercivity can be independently controlled, and a smooth particle surface is produced.

The invention has been described in detail with particular reference to preferred embodiments thereof, but is will be understood that variations and modifications can be effected within the spirit and scope of the invention.

What is claimed is:

1. A interdipsersed two-phase ferrite composite which comprises about 0.1 mole to about 1.0 moles of a spinel phase having the general formula MFe$_2$O$_4$ where M is at least one element that forms a spinel ferrite, to about 2.5 moles of a magnetoplumbite phase having the general formula R$_x$P$_{1-x}$Fe$_{12}$O$_{19}$ where R is a rare earth element selected from the group consisting of lanthanum, neodymium, praseodymium, samarium, europium, and mixtures thereof, P is selected from the group consisting of strontium, barium, calcium, lead, and mixtures thereof, and x has a value of from about 0.1 to about 0.4.

2. A composite according to claim 1 wherein M is zinc.

3. A composite according to claim 1 wherein R is lanthanum.

4. A composite according to claim 1 wherein P is strontium.

5. A composite according to claim 1 wherein said spinel phase has the formula ZnFe$_2$O$_4$ and said magnetoplumbite phase has the general formula La$_x$Sr$_{(1-x)}$Fe$_{12}$O$_{19}$.

6. A particle formed of a composite according to claim 1.

7. A particle according to claim 6 which is generally spherical.

8. A carrier for use in electrostatography comprising particles according to claim 6 magnetized and coated with a polymer.

9. A carrier according to claim 8 having a particle size of about 5 to about 60 micrometers.

10. A carrier according to claim 9 having a particle size of about 5 to about 20 micrometers in diameter.

11. A developer comprising about 75 to about 99 weight percent of a carrier according to claim 8 and about 1 to about 25 weight percent of a toner.

12. A magnetic brush comprising a multiplicity of juxtaposed magnetically aligned hairs formed of a carrier according to claim 8.

* * * * *